United States Patent
Jimenez et al.

(10) Patent No.: US 9,062,705 B2
(45) Date of Patent: Jun. 23, 2015

(54) LOCKABLE SINGLE PIECE NUT ASSEMBLY

(71) Applicant: STEMCO LP, Longview, TX (US)

(72) Inventors: Daniel Trejo Jimenez, Diana, TX (US); Xuesi Wang, Longview, TX (US)

(73) Assignee: STEMCO LP, Longview, TX (US)

( * ) Notice: Subject to any disclaimer, the term of this patent is extended or adjusted under 35 U.S.C. 154(b) by 64 days.

(21) Appl. No.: 14/051,292

(22) Filed: Oct. 10, 2013

(65) Prior Publication Data

US 2015/0104268 A1 Apr. 16, 2015

(51) Int. Cl.
*F16B 39/10* (2006.01)
*F16B 39/26* (2006.01)
*F16B 37/00* (2006.01)

(52) U.S. Cl.
CPC .............. *F16B 39/26* (2013.01); *F16B 37/00* (2013.01); *F16B 39/108* (2013.01)

(58) Field of Classification Search
CPC ........ F16B 39/08; F16B 39/10; F16B 39/108; F16B 39/26; F16B 37/00
USPC ......................................... 411/204, 431, 432
See application file for complete search history.

(56) References Cited

U.S. PATENT DOCUMENTS

| 687,774 | A | | 12/1901 | Oliver |
|---|---|---|---|---|
| 763,950 | A | | 7/1904 | Beckett |
| 1,077,670 | A | | 11/1913 | Church |
| 3,581,609 | A | | 6/1971 | Greenwood |
| 3,942,570 | A | | 3/1976 | Bochman, Jr. et al. |
| 4,534,101 | A | | 8/1985 | Rosan, Jr. |
| 4,812,094 | A | | 3/1989 | Grube |
| 5,180,265 | A | | 1/1993 | Wiese |
| 5,190,265 | A | * | 3/1993 | Barry et al. .................... 254/8 B |
| 5,533,794 | A | | 7/1996 | Faison |
| 5,533,849 | A | | 7/1996 | Burdick |
| 5,597,278 | A | * | 1/1997 | Peterkort ....................... 411/134 |
| 5,618,143 | A | | 4/1997 | Cronin, II et al. |
| 5,618,145 | A | | 4/1997 | Kuo |
| 5,674,034 | A | * | 10/1997 | Bennett ......................... 411/197 |
| 5,772,373 | A | * | 6/1998 | Cronin et al. .................. 411/120 |
| 5,871,322 | A | * | 2/1999 | Nakamura ..................... 411/432 |
| 6,290,442 | B1 | | 9/2001 | Peterkort |
| 6,554,555 | B2 | | 4/2003 | Imahigashi |
| 6,749,386 | B2 | | 6/2004 | Harris |
| 7,029,218 | B2 | | 4/2006 | Peterkort |
| 7,226,259 | B2 | | 6/2007 | Harris |
| 7,811,038 | B2 | | 10/2010 | Jimenez |
| 8,011,866 | B2 | | 9/2011 | Harris |
| 8,292,373 | B2 | | 10/2012 | Rieger et al. |
| 8,403,611 | B2 | | 3/2013 | Friesen et al. |
| 2002/0136617 | A1 | | 9/2002 | Imahigashi |
| 2004/0213646 | A1 | | 10/2004 | Jakuszeski et al. |
| 2005/0025604 | A1 | | 2/2005 | Slesinski et al. |
| 2011/0027041 | A1 | | 2/2011 | Friesen et al. |
| 2011/0194911 | A1 | | 8/2011 | Leroyer |
| 2011/0316325 | A1 | | 12/2011 | Martin, III et al. |

OTHER PUBLICATIONS

International Search Report and Written Opinion issued by the Korean Intellectual Property Office for PCT/US14/59129, mailed Jan. 14, 2015. 11 pages.

* cited by examiner

*Primary Examiner* — Gary Estremsky
(74) *Attorney, Agent, or Firm* — Perkins Coie LLP

(57) ABSTRACT

A nut assembly is provided. The nut assembly includes a nut having a bottom extension surface and an intermediate member. The intermediate member includes at least one radially extending slot. The nut assembly also includes a washer having a base and an inner wall. The inner wall has a locking feature. The nut and the washer are operably coupled by a plurality of locking pins. The locking pin slidingly fits in the slot on the intermediate member and engages the locking feature when the nut assembly is in the installed configuration.

27 Claims, 20 Drawing Sheets

LOCKABLE SINGLE PIECE NUT ASSEMBLY

CROSS-REFERENCE TO RELATED PATENT APPLICATIONS

None

BACKGROUND

Nut assemblies are well known implements generally used to hold an object in place and may be used in numerous different applications. A conventional nut assembly comprises a nut and a washer that are operably coupled. In one exemplary use, a nut assembly may be used in an axle wheel end for a vehicle to hold the wheel end to the spindle of the axle.

The nut of the nut assembly is generally a metal or composite part with a threaded bore. The threads operatively engage corresponding threads on the spindle, for example. The nut assembly is screwed onto the spindle and tightened against the object to be held in place. However, conventional nut assemblies have been known to "back off" or "reverse thread" during use, which generally involves the nut moving in relation to the washer. The backing off, in the example of attaching the wheel end to the spindle, may allow the wheel end to become loose. If the wheel end becomes loose, it may leak or even break causing damage to the vehicle. Moreover, this presents a safety concern.

To inhibit the backing off, nut assemblies have been provided that have a locking feature. For example, U.S. Pat. No. 7,811,038, titled "Self-Locking Nut," the disclosure of which is incorporated herein by reference as if set out in full, provides a nut with a locking tab that is designed to operatively engage a groove associated with a locking feature in the washer. When the locking tab is engaged, rotation of the nut relative to the washer is inhibited by the tab flexing against the washer and resisting the movement of the nut. U.S. Pat. No. 8,403,611, titled "Single Piece Nut Assembly," the disclosure of which is incorporated herein by reference as if set out in full, provides another nut with a holding feature associated with the nut that is designed to engage a groove in a locking feature associated with the washer. The '611 Patent further discloses a spring loaded lock. The various features of the '611 patent are operable to lock the device into a configuration and resist relative motion between the washer and the nut.

As functional as the nuts described in the '038 and the '611 patent are, improvement in the operation and functionality of nut assemblies is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a nut assembly is provided. The nut assembly includes a nut and a washer. The nut assembly has an uninstalled configuration where the nut and the washer can spin relative to each other, and an installed configuration where the nut and the washer cannot spin relative to each other. A lock pin is operatively coupled to the nut and the washer and moveable to engage (or disengage) a lock feature that inhibits the relative movement.

In some aspects, a spring or elastic member holds the lock pin to the nut and washer. When in the uninstalled configuration, the member holds the lock pin such that the lock pin rotates with the nut in relation to the washer. When in the installed configuration, the member causes a head of the lock pin to engage a lock feature in the washer such that the nut, lock pin, and washer cannot rotate with respect to each other.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to self-locking nut assemblies usable on a wheel end. However, the technology described herein may be used for other systems where a self-locking fastener is desirable. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
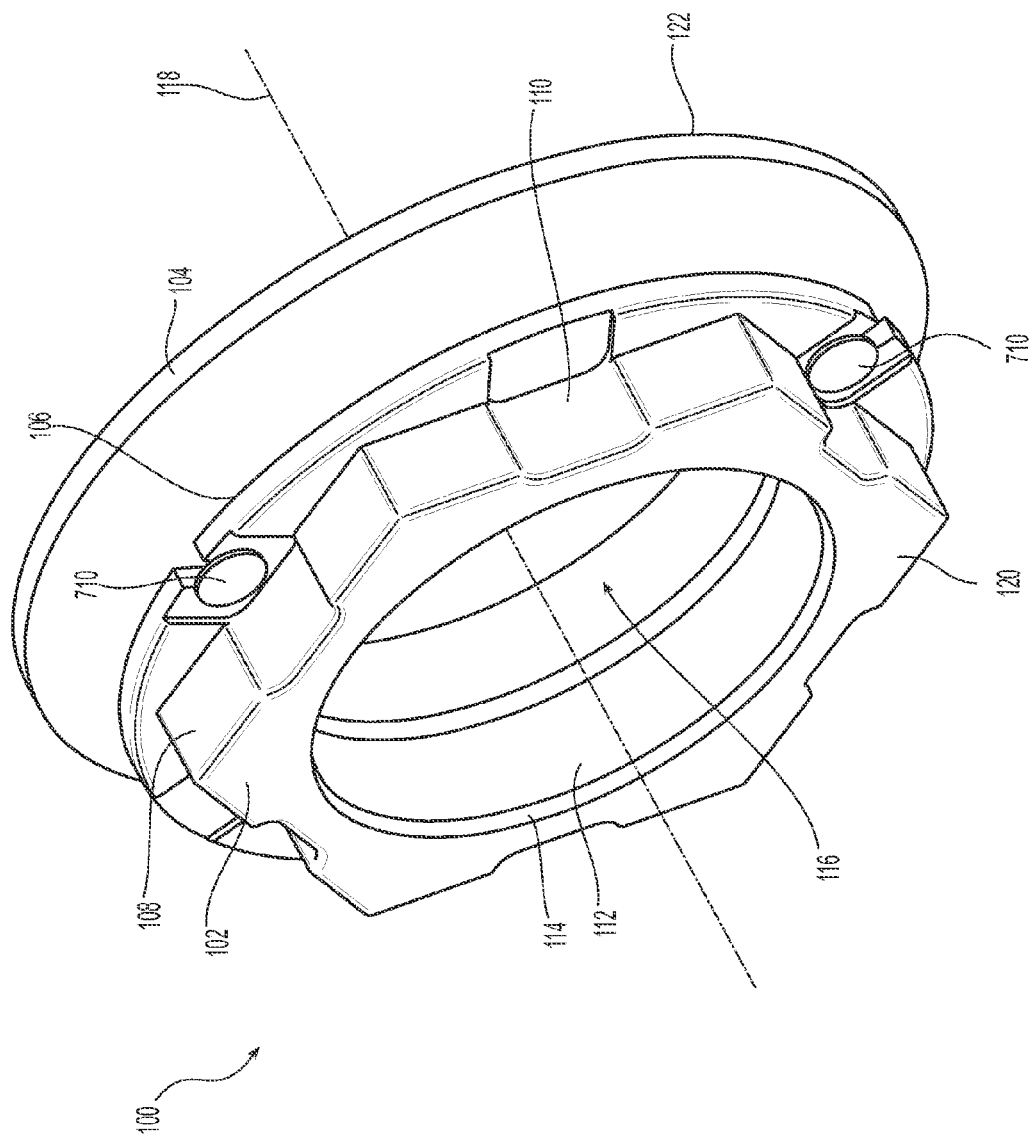
FIG. 1 is a perspective view of a nut assembly consistent with the technology of the present application.
Figure 2:
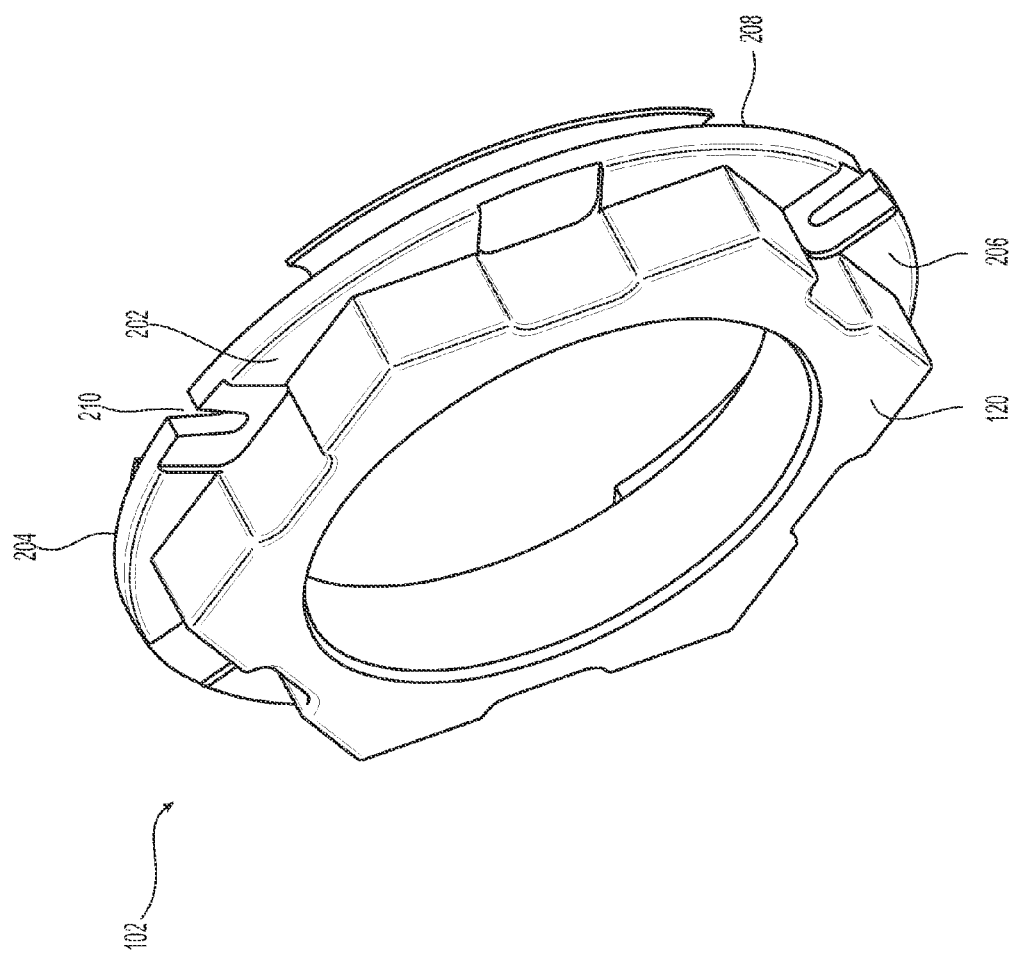
FIG. 2 is a perspective view of the nut of the nut assembly shown in FIG. 1.

With reference now to FIG. 1, a nut assembly 100 is provided. The nut assembly 100 comprises a nut 102, a washer 104, and a cover 106. The nut 102 is shown having an outer surface 108 that generally forms a hexagonal shape, which comprises six (6) flat surfaces. Each of the flat surfaces has a corresponding detent 110, which may be a channel or groove as shown, as will be explained further below. The outer surface 108 may form any of a number of shapes including circular, rectangular, triangular, or other polynomial shapes. The shape is largely defined by the associated tool shape to grip the nut. The nut 102 also has an inner surface 112, which generally forms a circular (or cylindrical) shape. The cylindrical shape facilitates threads 114 on the inner surface 112 cooperatively engaging threads on the apparatus to which the nut assembly is to be attached, such as, for example, an axle spindle or the like. The nut assembly 100 generally defines a conduit 116 extending along an longitudinal axis 118 from a top side 120 of the nut assembly 100 through to a bottom side 122 of the nut assembly 100. While shown as a cylindrical conduit, the conduit could be keyed to inhibit rotation when installed and have, for example, a D shape or other similar shapes.

With reference to FIGS. 2-5, the nut 102 of nut assembly 100 is described in additional detail. The outer surface 108 of nut 102 extends from the top side 120 to an intermediate member 202. The intermediate member 202 extends radially outward from the outer surface 108 and terminates at a first circumferential edge 204. The intermediate member 202 has a top facing surface 206 and a bottom facing surface 208. The intermediate member 202 (or flanged surface) has at least one elongate slot 210. In the exemplary nut 102 shown, the intermediate member 202 has three elongate slots 210. The slots extend from the top facing surface 206 to the bottom facing surface 208. The elongate slots 210 are parallel to the normal line and extend radially inwardly from the circumferential edge 204. The elongate slots 210 are shown open at the circumferential edge 204, but could be closed as well.

Figure 3:
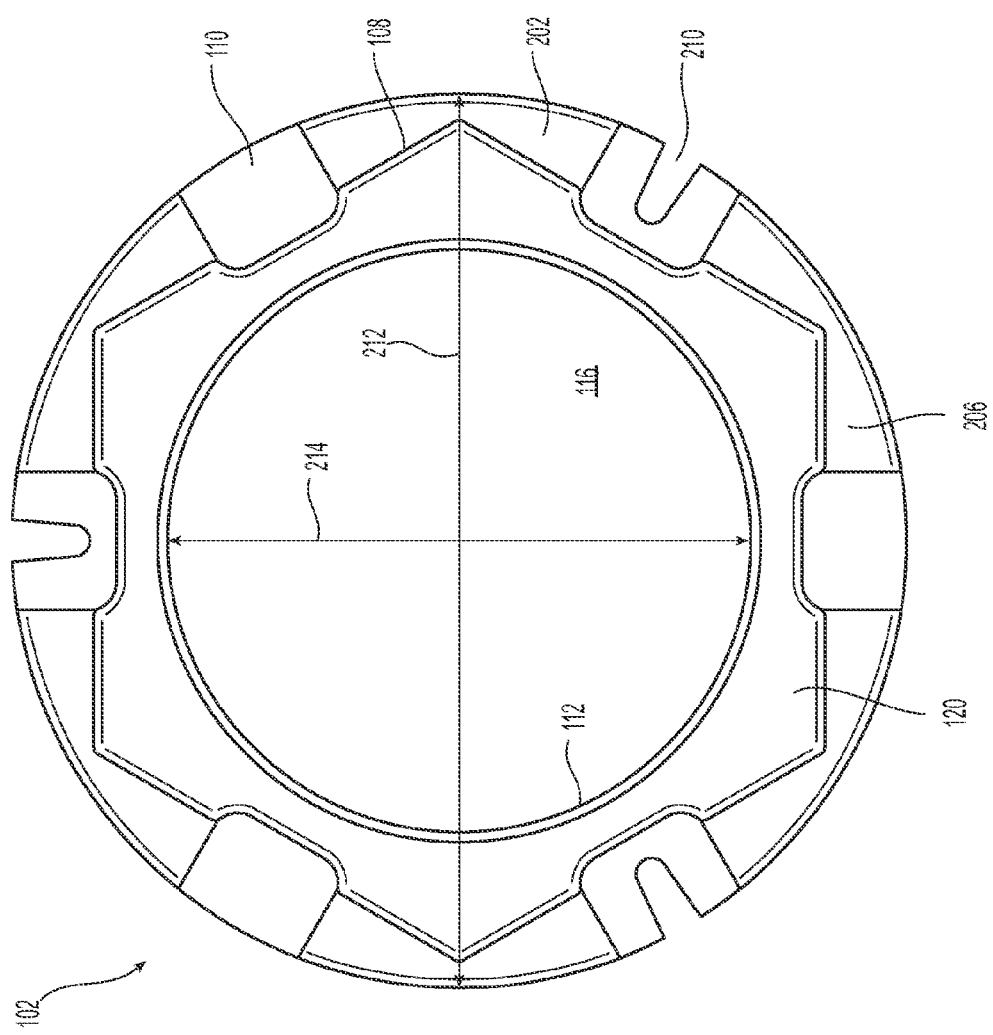
FIG. 3 is a top plan view of the nut of the nut assembly shown in FIG. 1.

As best seen in FIG. 3, the nut 102 has a maximum outer diameter 212 and the conduit 116, or bore, has an inner diameter 214. The inner diameter 214 is sized such that the nut assembly 100 cooperatively engages the threads of, for example, a spindle.

Figure 4:
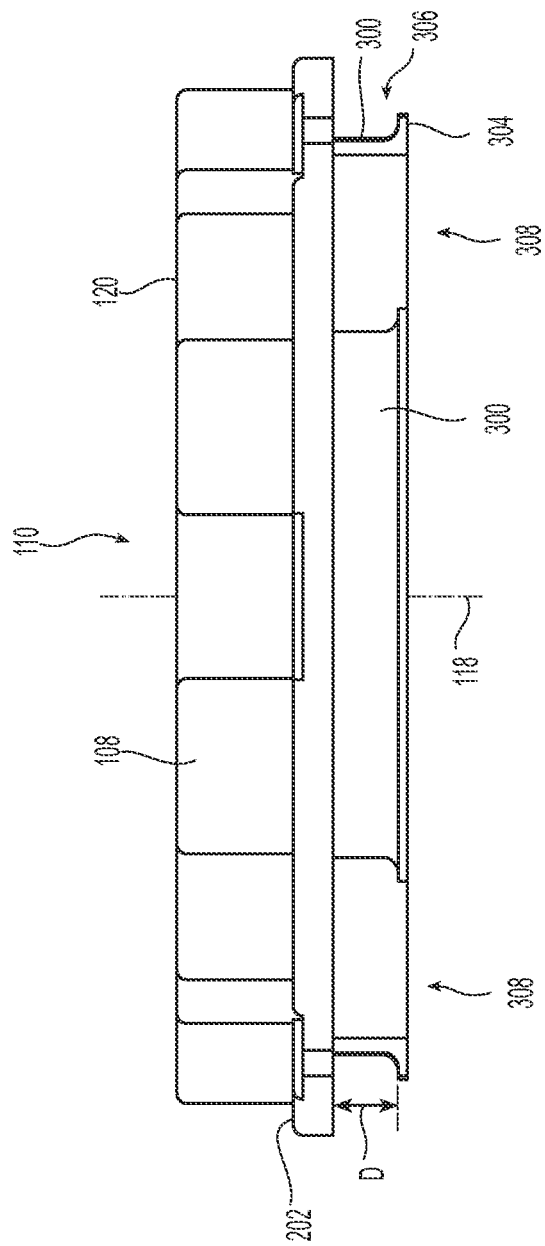
FIG. 4 is a side elevation view of the nut of the nut assembly shown in FIG. 1.
Figure 5:
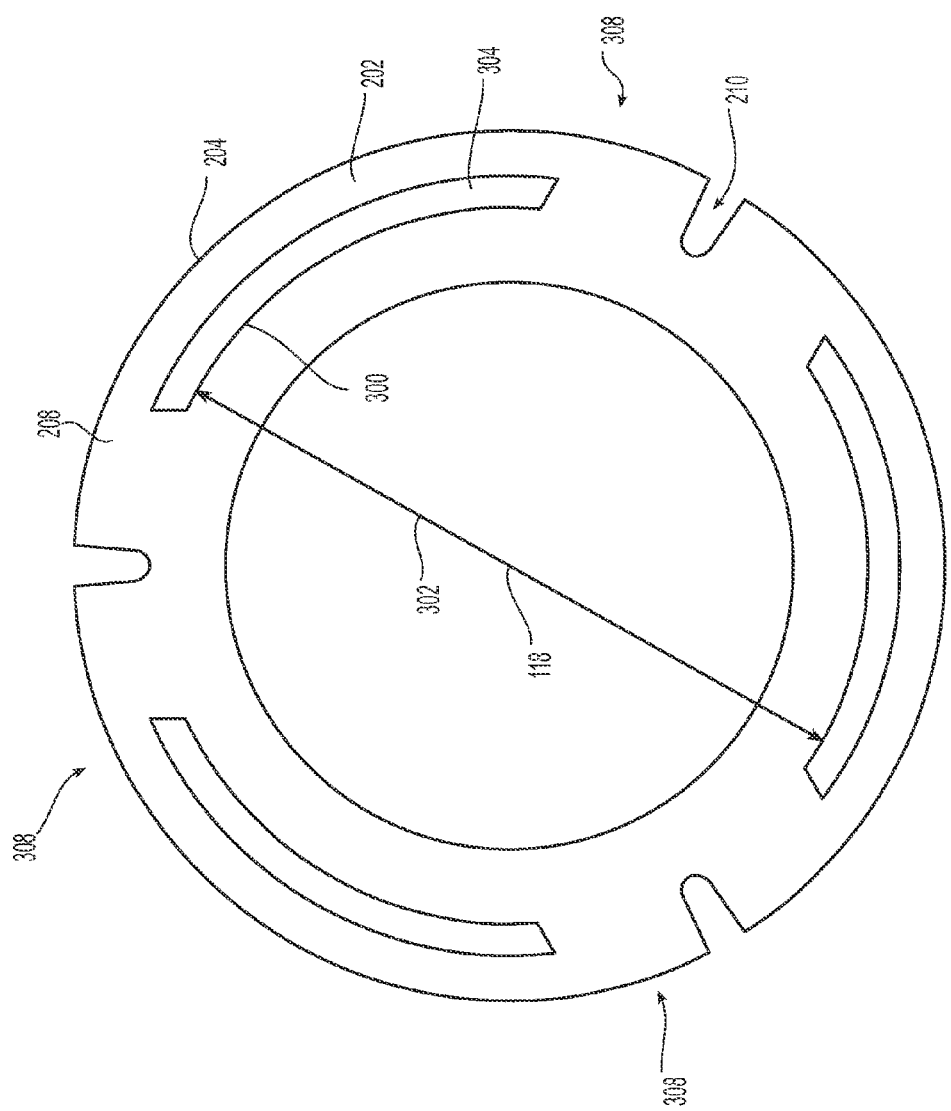
FIG. 5 is a bottom plan view of the nut of the nut assembly shown in FIG. 1.
Figure 6:
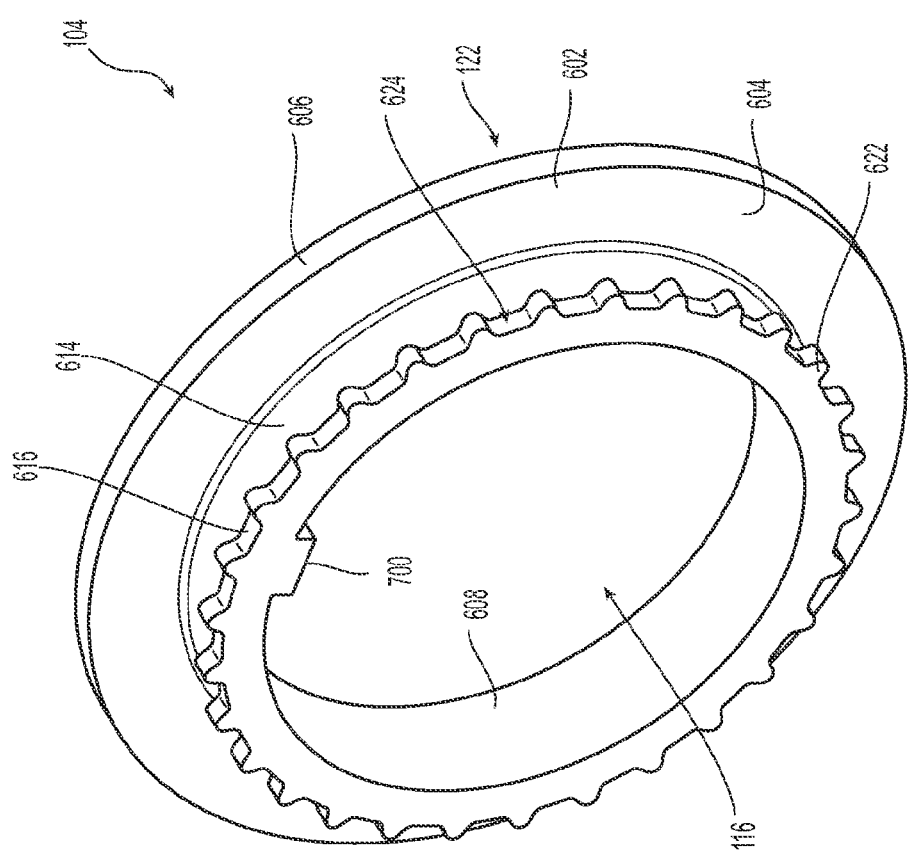
FIG. 6 is a perspective view of the washer of the nut assembly shown in FIG. 1.

With reference now to FIG. 4, a side elevation view of the nut 102 is provided. The nut 102 comprises the outer surface 108 that extends from the top surface 120 to the intermediate member 202. The nut 102 also comprises a plurality of bottom extension surfaces 300. The bottom extension surfaces 300 may be parallel to the longitudinal axis 118 or may be oblique to the longitudinal axis 118. As shown in FIG. 5, the bottom extension surface 300 of the exemplary nut 102 are parallel to the longitudinal axis 118. The bottom extension surfaces 300 are arranged to form a discontinuous circle having a diameter 302 that is greater than inner diameter 224 but less than outer diameter 212. If the bottom extension surfaces 300 were oblique to the longitudinal axis 118, the bottom extensions would typically taper radially outward such that the bottom extension surfaces have a first diameter $302_t$ proximal the intermediate member 202 and a second diameter $302_b$ distal from the intermediate member where the second diameter $302_b$ is greater than the first diameter $302_t$. The discontinuous bottom extension surfaces 300 provide for a plurality of gaps 308. The bottom extension surface 300 extends a distance D and terminates in a flared surface 304. The flared surface 304 in conjunction with the bottom extension surface 300 and the bottom facing surface 208 of intermediate member 202 form a channel 306. As will be explained further below, the gaps 308 and the elongate slots 210 cooperate to receive portions of a pin member.

With reference now to FIGS. 6-9, the washer 104 of FIG. 1 is described and shown in more detail. The washer 104 comprises a base 602 that has the bottom side 122 of the nut assembly 100 and a stop surface 604 opposite the bottom side 122. The stop surface 604, as will be explained more fully below, abuts the flared surface 304 when the nut assembly is in the installed configuration. The base 602 has an outer base circumferential edge 606 and an inner base circumferential edge 608. The inner circumferential edge 608 generally defines the conduit 116 that extends through the washer 104. The outer circumferential edge 606 defines an outer diameter 610. The inner circumferential edge 608 defines an inner diameter 612. The outer diameter 610 is about equal to the outer diameter 212 of the nut 102. The inner diameter 612 is about equal to the inner diameter 214 of the nut 102.

Figure 8:
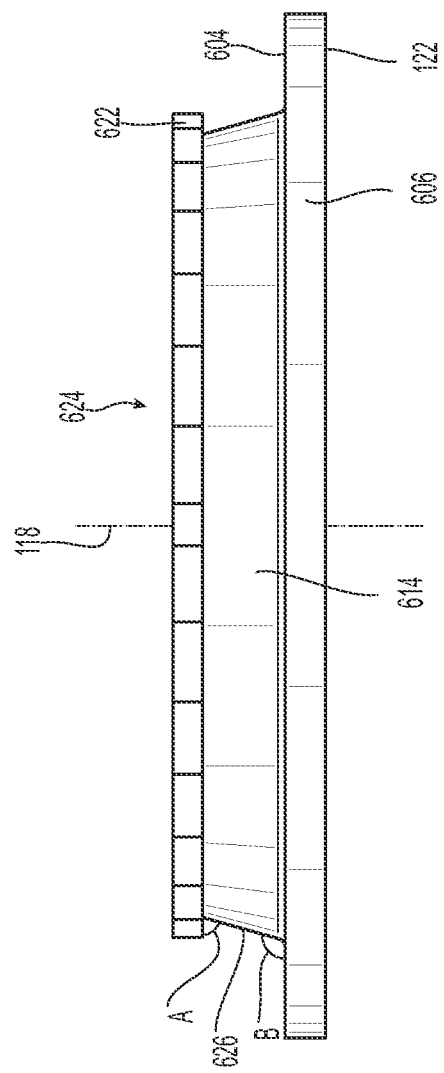
FIG. 8 is a side elevation view of the washer of the nut assembly shown in FIG. 1.

The washer 104 comprises an inner wall 614 along the inner circumferential edge 608. The inner wall 614 extends from the stop surface 604 towards the top surface 120 of the nut 102. The inner wall 614 terminates at a top rim 616 that has a rim surface 618 that abuts the bottom facing surface 208 of the nut 102 when the nut assembly 100 is in the installed configuration. The top rim 616 also has a radially outward extending locking feature 620. The locking feature 620 in this exemplary embodiment comprises a flanged surface 622, which may be referred to as a lip or shoulder. The flanged surface 622 contains a plurality of notches 624 that may be machined into the flanged surface 622. The locking feature 620 may be beveled to form a peak and valley locking feature, but the peak and valley arrangement is only exemplary. In alternative configurations, the locking feature 620 may be a saw tooth configuration, a step function configuration, or the like. The inner wall 614 may comprise an inclined outward facing surface 626 as best seen in FIG. 8. The inclined outward facing surface 626 is generally inclined such that the inclined outward facing surface 626 forms an acute angle A with the flanged surface 622 and an obtuse angle B with the stop surface 604.

Figure 7:
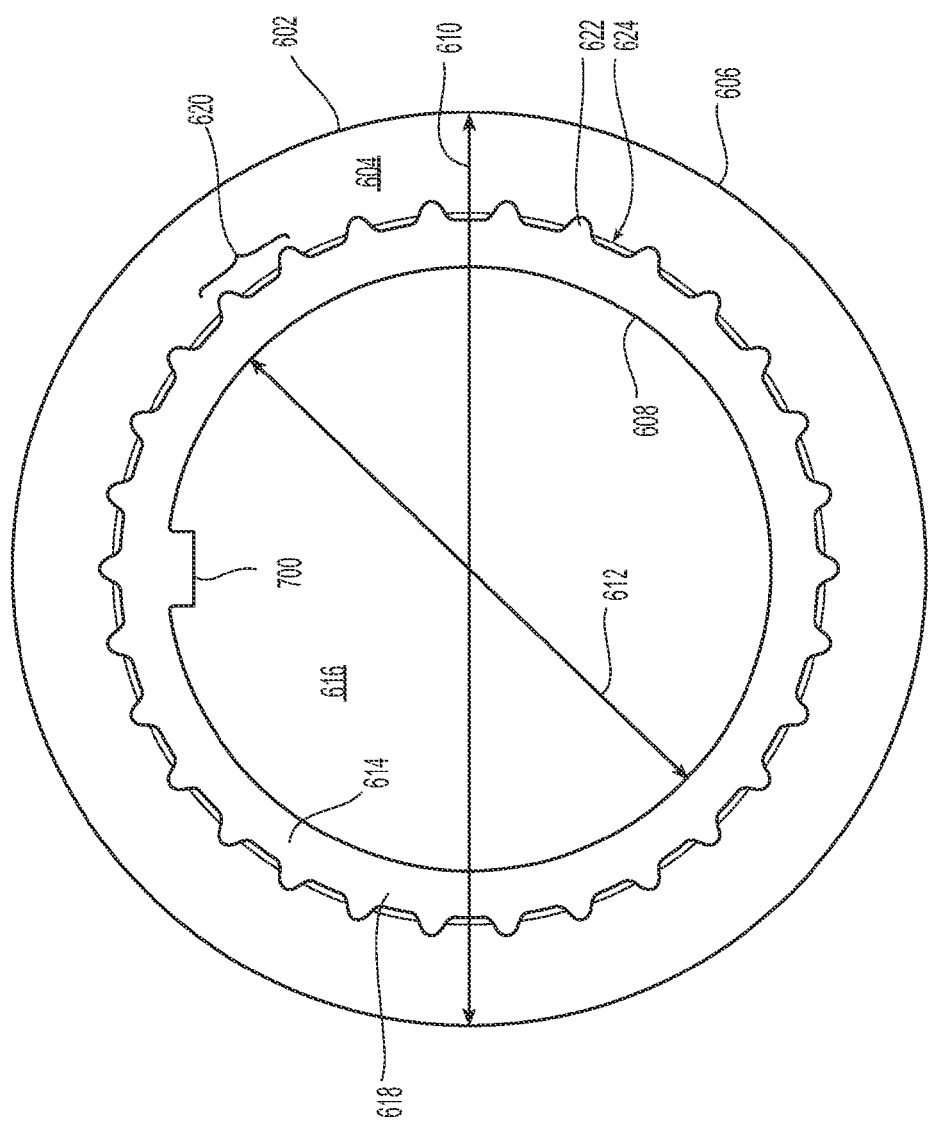
FIG. 7 is a top plan view of the washer of the nut assembly shown in FIG. 1.
Figure 9:
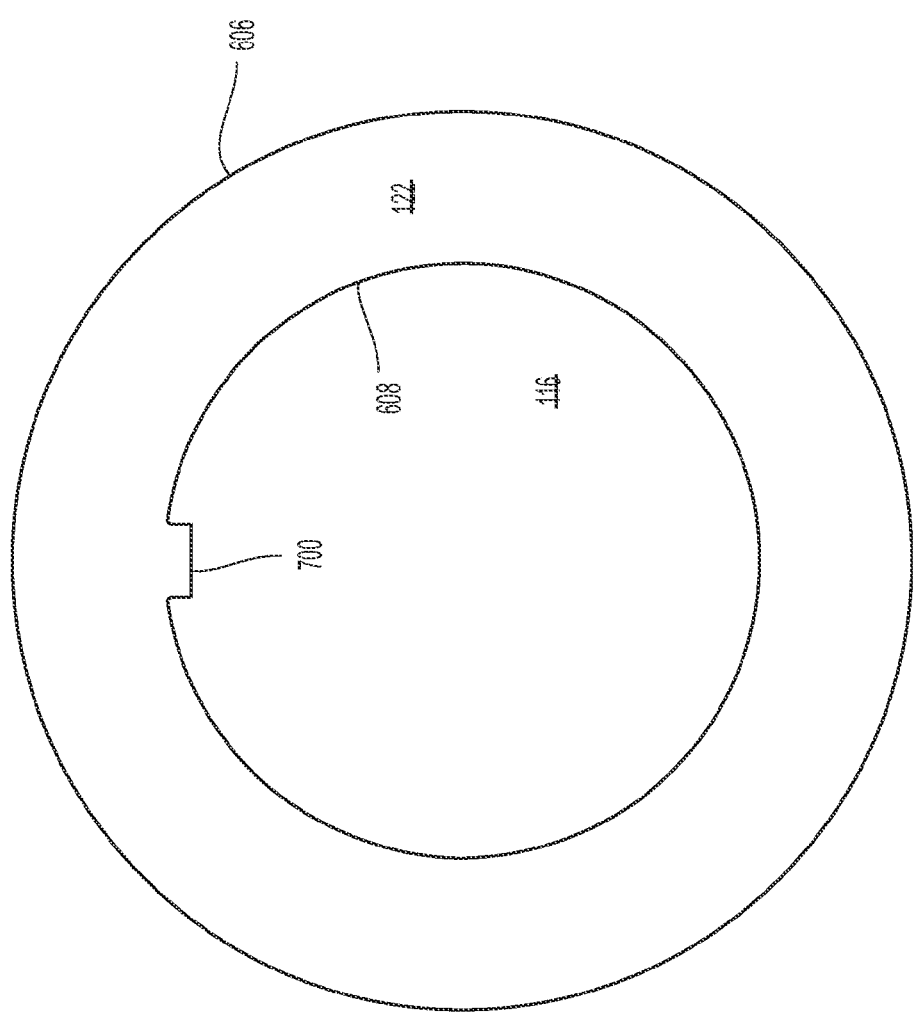
FIG. 9 is a bottom plan view of the washer of the nut assembly shown in FIG. 1.

As best seen in FIGS. 7 and 9, the washer 104 includes a radially inwardly extending tang 700. The tang 700 is used in conjunction with a keyway on the spindle, for example, to allow for alignment of the nut assembly 100. Further, the tang 700 when engaged with the keyway on the spindle inhibits rotation of the washer 104 when the nut 102 is being threaded onto the spindle. The tang 700 is an exemplary anti-rotation means, but other similar key arrangements may be used, such as, for example, a washer comprising a flat on the inner surface forming a D shape, a pin, or the like.

Figure 10:
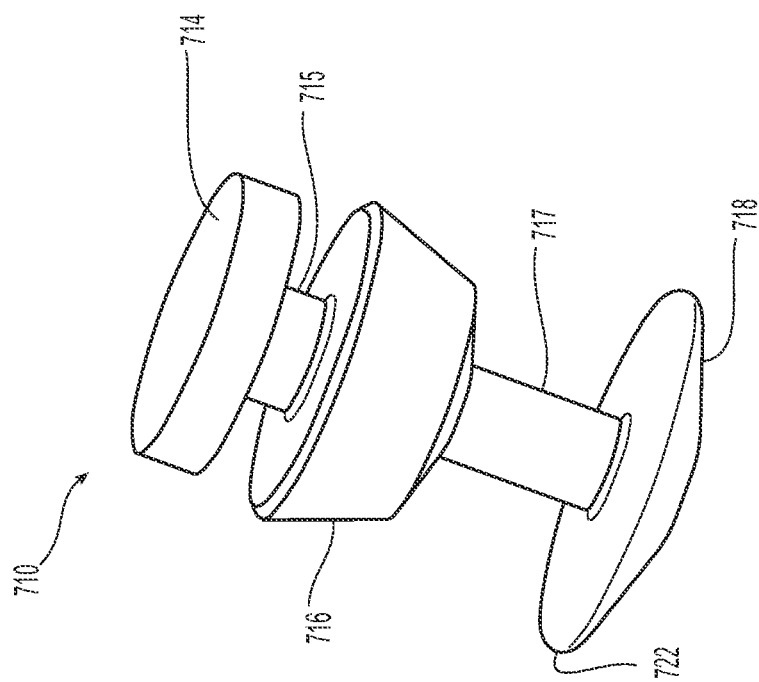
FIG. 10 is a perspective view of a locking pin of the nut assembly shown in FIG. 1.
Figure 11:
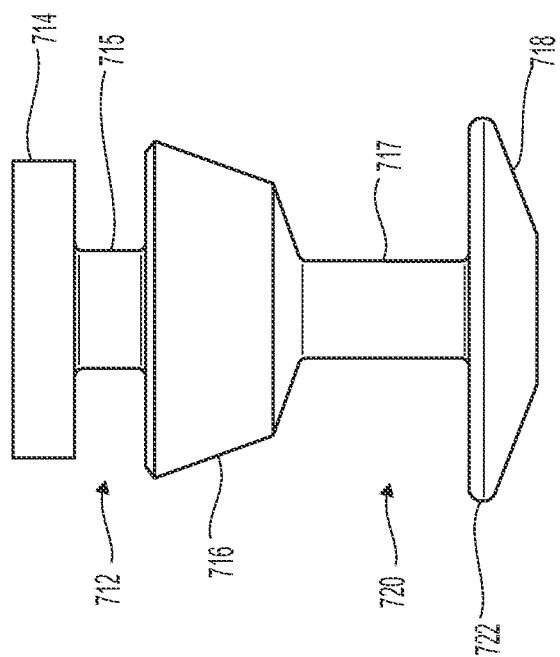
FIG. 11 is a side elevation view of the locking pin of the nut assembly shown in FIG. 1.

With reference to FIGS. 10 and 11, a pin 710 is shown. The nut assembly 100 comprises a plurality of pins 710, of which FIG. 1 shows two (2) of three (3) pins 710. More or less pins 710 are possible, however. Also, while shown and described as placed equidistant around the intermediate member 202, other configurations are possible. The pin 710 comprises a top cap 714, a top shaft 715, a plug 716, a bottom shaft 717, and a bottom cap 718. The top cap 714, top shaft 715, and plug 718 form a recess 712. The recess 712 is sized to slidingly receive the intermediate member 202 such that the top shaft 715 is slidingly received in the elongate slot 210. The plug 716, bottom shaft 717, and bottom cap 718 form a recess 720. The recess 720 is sized to slidingly fit the locking feature 620, which would encompass at least the flanged surface 622 in this exemplary embodiment. The bottom cap 718 has a sliding edge 722 that slidingly engages the inclined outward facing surface 626. The plug is sized to slidingly fit into one of the plurality of notches 624. As can now be appreciated, the plug 716 is tapered to facilitate alignment of the plug 716 with the notch.

Figure 12:
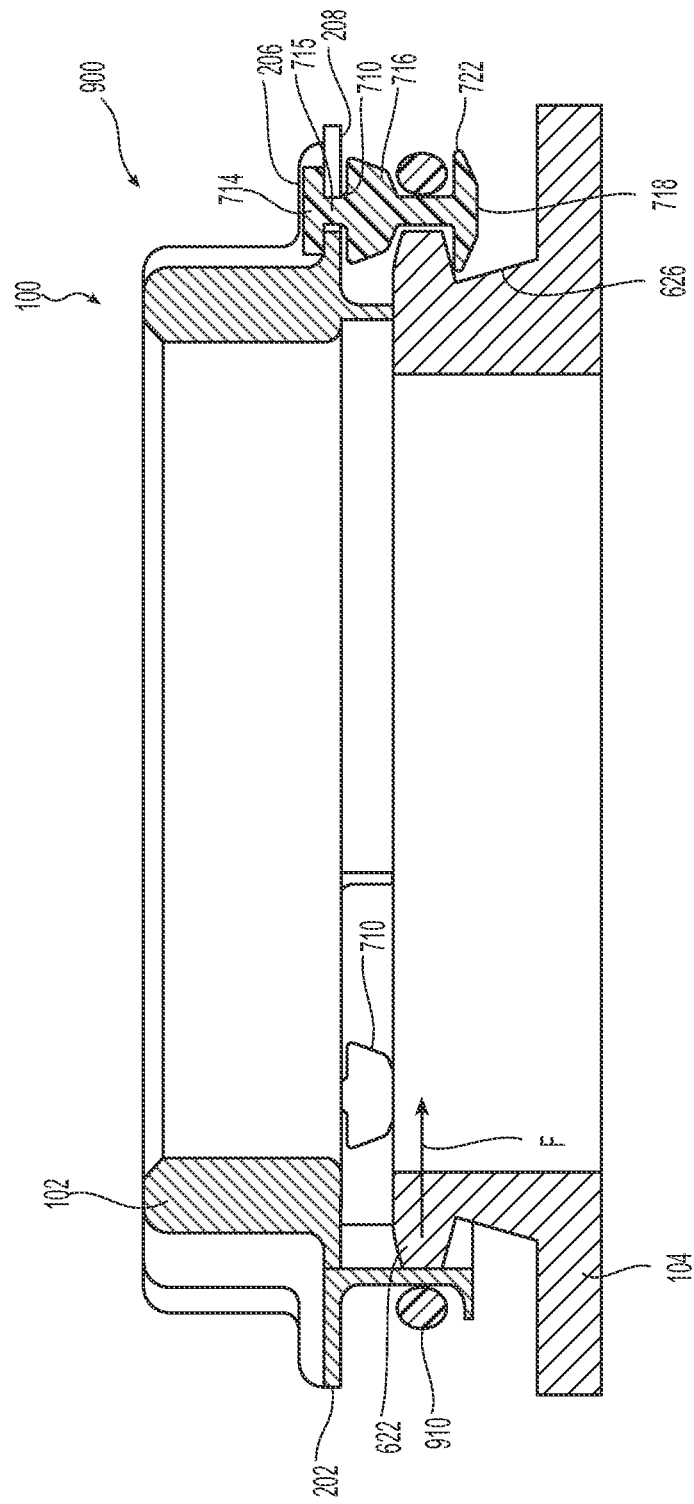
FIG. 12 is a cross sectional view of the nut assembly of FIG. 1 in an uninstalled configuration.
Figure 13:
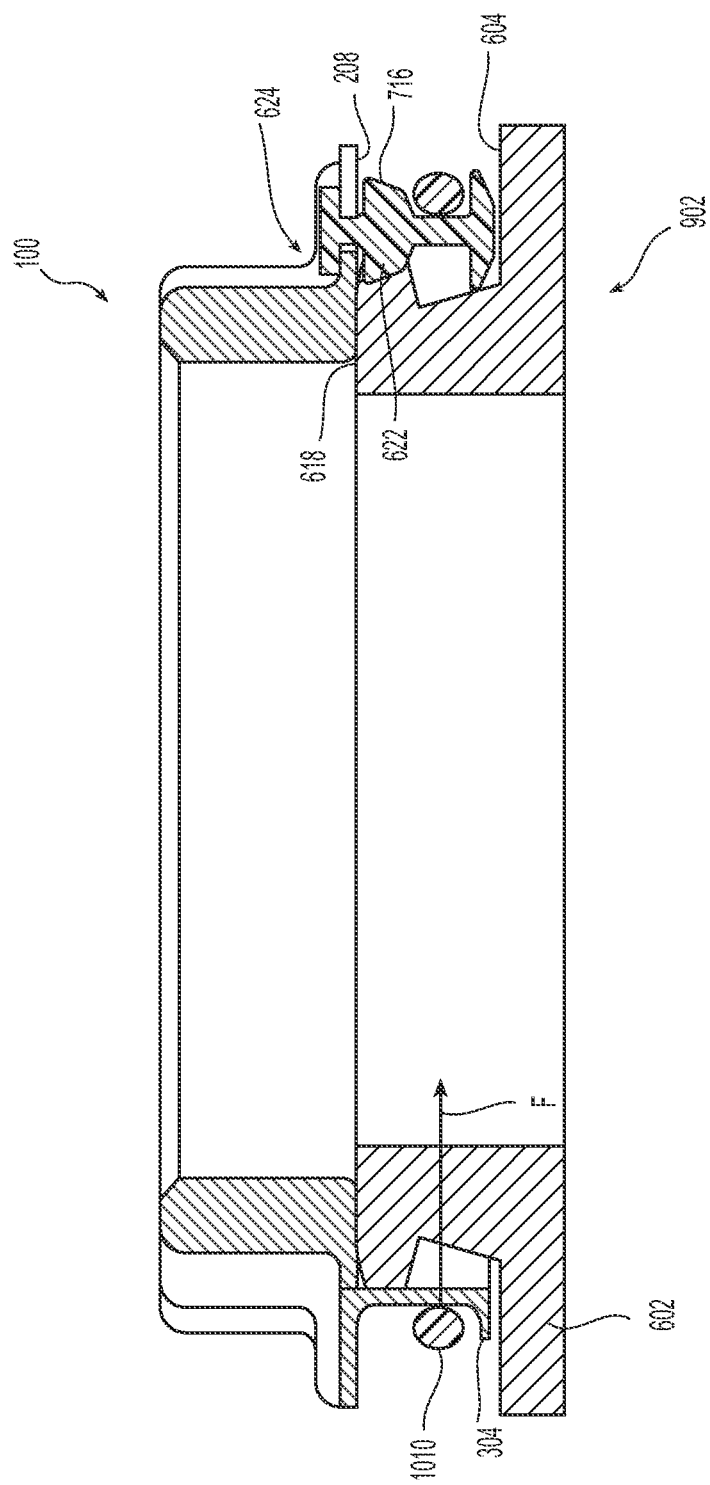
FIG. 13 is a cross sectional view of the nut assembly of FIG. 1 in an installed configuration.

The nut assembly 100, without the cover 106, is shown in cross section in FIGS. 12 and 13. FIG. 12 shows the nut assembly 100 in an uninstalled configuration 900 and FIG. 13 shows the nut assembly 100 in an installed configuration 902.

The nut assembly 100 includes the nut 102 and the washer 104. The plurality of pins 710 are operatively coupled to both the nut 102 and the washer 104. The top shaft 715 is slidingly engaged with the elongate slot 210. Additionally, the top cap 714 may slidingly abut the top facing surface 206 and the plug 716 may slidingly abut the bottom facing surface 208. The locking feature 620, and in particular the flanged surface 622, is received in the recess 720. As shown in FIGS. 12 and 13, an elastic member 910, such as a spring (as shown a garter spring) or an elastic cord, also is received in recess 720. The elastic member 910 is received in recess 720 on a side opposite the bottom shaft 717 of the flanged surface 622. The elastic member 910 otherwise resides in channel 306 about the bottom extension surface 300 of the nut 102 to provide a radially inwardly directed force F tending to pull the plurality of pins 710 inwardly. The sliding edge 722 of the bottom cap 718 engages the inclined outward facing surface 626. The inwardly directed force F tends to cause the nut 102 and the washer 104 to move towards the uninstalled configuration 900. The bottom cap 718 also slidingly moves along the underside of the flanged surface 622 allowing the nut 102 to rotate with respect to the washer 104.

As can be seen best in FIG. 13, when in the installed configuration 902, the nut 102 has been moved closer to the base 602. As shown, the flared surface 304 may abut the stopping surface 604. Also, the bottom cap 718 may abut the stopping surface 604. The bottom facing surface 208 abuts the rim surface 618. As shown, each of the plugs 716 is operatively fitted into one of the plurality of notches 624 formed in flanged surface 622.

Figure 15:
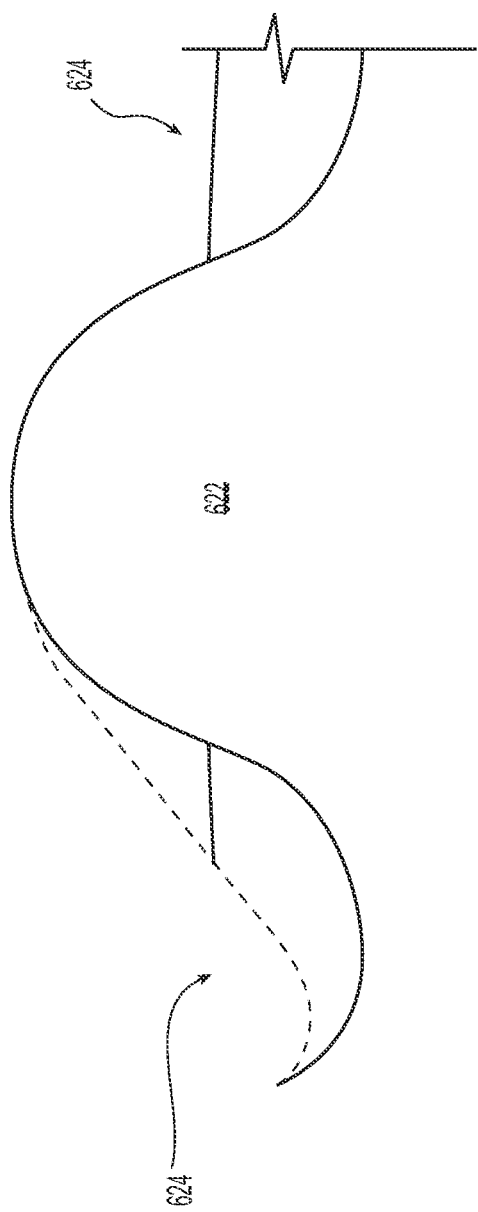
FIG. 15 is a top plan view of the locking feature of the washer shown in FIGS. 6-9.

As can be appreciated, threading the nut 102 onto a device, such as a spindle (not shown) moves the nut 102 towards the washer 104. The movement of the nut 102 towards the washer 104 correspondingly moves the pin 710 rotationally and downward toward the washer 104. As the plug 716 of the pin 710 engages the locking feature 620 of the washer 104, the ability of the nut 102 to freely rotate with respect to the washer 104 is inhibited. The plug 716 and the notches 624 of the locking features 620 can be squared off, but preferably are tapered and beveled. The taper on the plug 716 tends to move the pin 710 radially outward against the force F provided by the elastic member 910. The taper and bevels allow for a sufficient rotational force (or torque) to be applied to nut 102 to cause the plug 716 to move against the locking feature 620 causing the pin 710 to move outward against the inwardly directed force F of the elastic member 910 such that the nut 102 can be completely threaded and unthreaded on the device and be automatically locked. The curve of the locking feature 620 and the tension of the elastic member 910 combine to provide the required torque to move the nut 102 relative to the washer 104 when the plug 716 engages the notches 624. Generally, the torque is between 10 and 50 pounds but is largely a function of the design. Moreover, the torque to seat the nut 102 on the washer 104 may be designed to be less than the torque to un-seat the nut 102 from the washer 104. This may be designed by an asymmetrical shape of the flanged surface 622 and notches 624. FIG. 15 shows flanged surface 622 and a pair of notches 624 forming a symmetrical shape such that the torque to seat or unseat the nut 102 is approximately equal. However, also shown in FIG. 15, in phantom, is an asymmetrical flanged surface 622 where the torque to seat the nut 102 is less than the torque required to unseat the nut 102. The plug 716 can similarly be shaped asymmetrically to alter the required torque in one or both directions.

Figure 14:
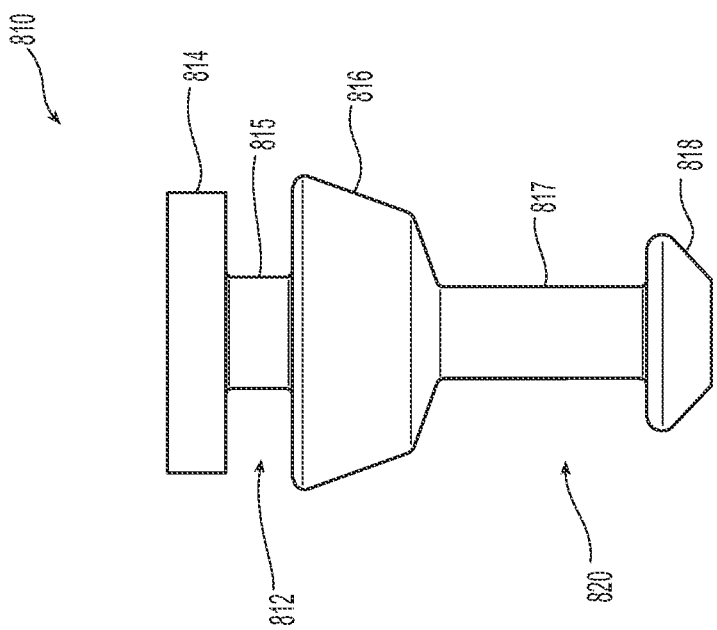
FIG. 14 is a side elevation view of an alternative locking pin of the nut assembly shown in FIG. 1.

FIG. 14 shows an alternative pin 810. Pin 810 is similar to pin 710 and includes a top cap 814, a top shaft 815, a plug 816, a bottom shaft 817, and a bottom cap 818. The top cap 814, top shaft 815, and plug 816 form a recess 812. The plug 816, bottom shaft 817, and bottom cap 818 form a recess 820. Unlike pin 710, however, pin 810 comprises a bottom cap 818 with a diameter less than the minimum diameter of the plug 816.

Figure 16:
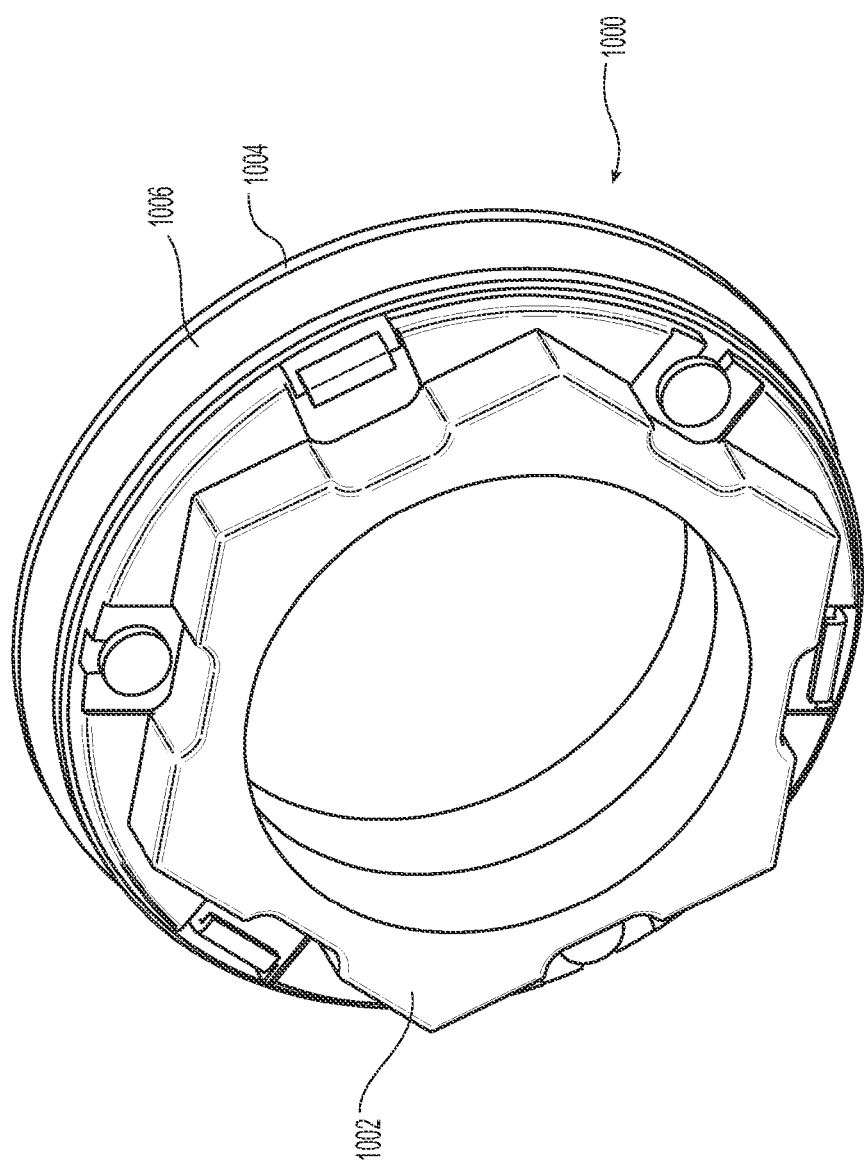
FIG. 16 is a perspective view of another nut assembly consistent with the technology of the present application.
Figure 17:
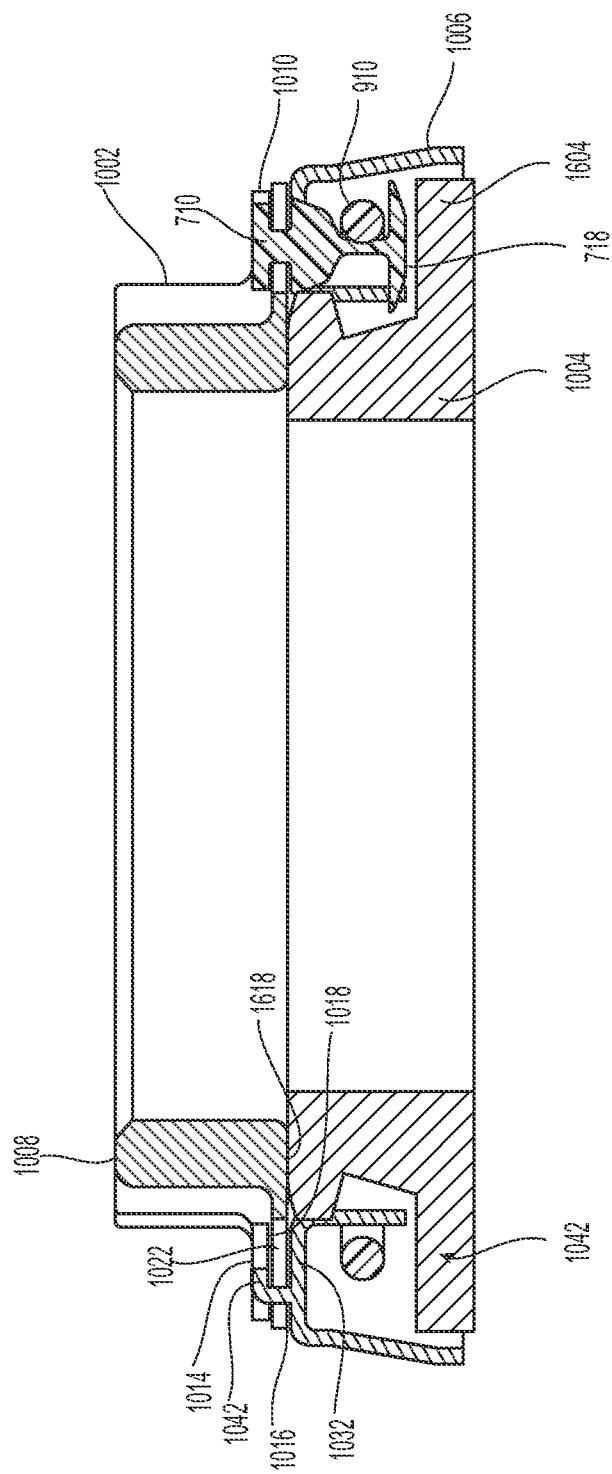
FIG. 17 is a cross-sectional view of the nut assembly of FIG. 16.

With reference now to FIG. 16, a perspective view of a nut assembly 1000 is shown. The nut assembly 1000 includes a nut 1002, a washer 1004, and a cover 1006. The nut assembly 1000 is similar to the nut assembly 100 above and the similarities will not be re-explained herein except to the extent necessary for the description of nut assembly 1000. FIG. 17 shows the nut assembly 1000 in cross-section. The nut 1002 comprises a top surface 1008 and an intermediate member 1010. An outer surface 1012 extends from the top surface to the intermediate member 1010. The intermediate member 1010 comprises a radially extending flanged surface. The intermediate member 1010 has a top facing surface 1014, a bottom facing surface 1016, and a plurality of elongate slots 1018 (shown in FIG. 16). The elongate slots 1018 receive locking pins 710 or 810 as described above with respect to the nut 102. In the installed configuration the bottom facing surface 1016 slidingly engages the rim surface 1618 of the washer 1004. The nut 1002.

Figure 18:
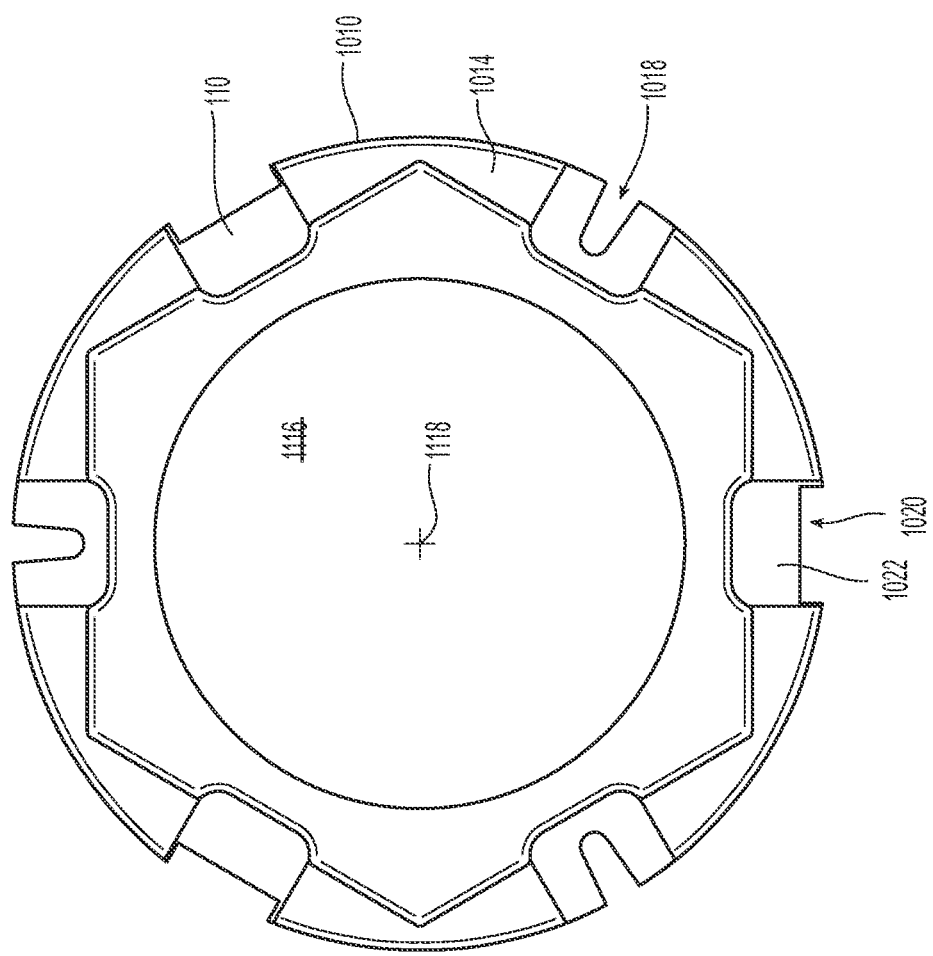
FIG. 18 is a top plan view of the nut of FIG. 16.

With reference now to FIG. 18, a top plan view of the nut 1002 is provided. Similar to the nut 102, the nut 1002 has a longitudinal axis 1118 and a bore 1116. The intermediate member 1010 includes a plurality of lock notches 1020. The lock notches 1020 terminate in a narrow shelf 1022 at the base of the detent 110.

Figure 19:
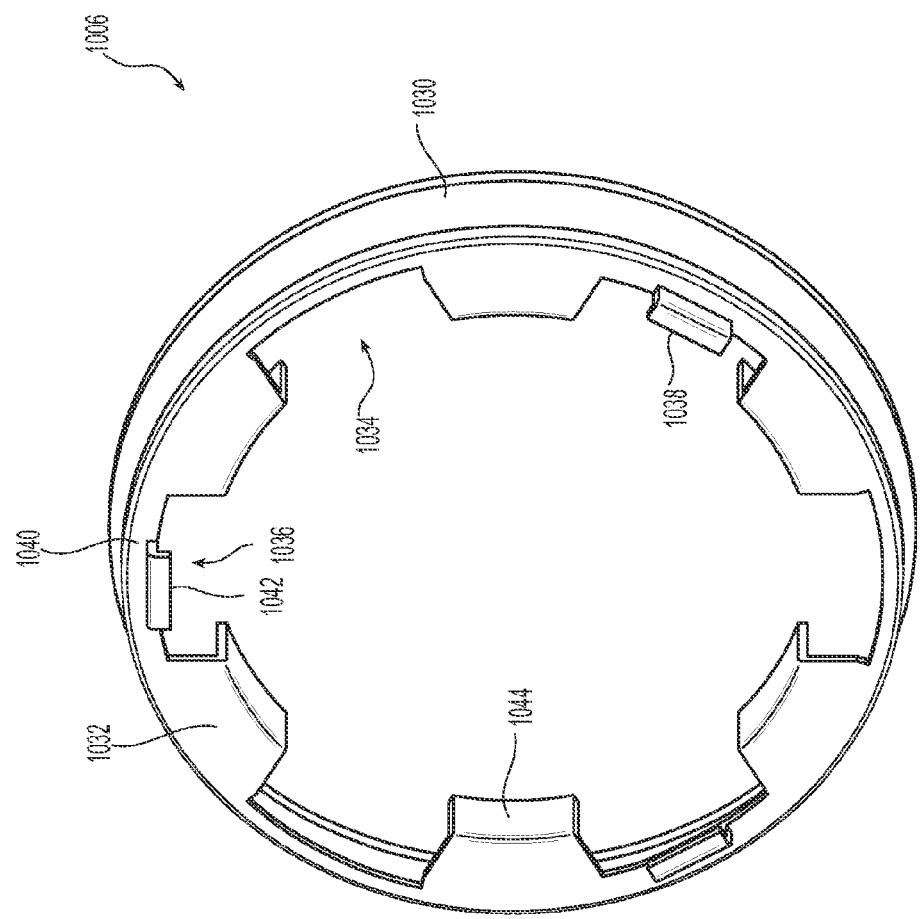
FIG. 19 is a perspective view of the cover of the nut assembly of FIG. 16.
Figure 20:
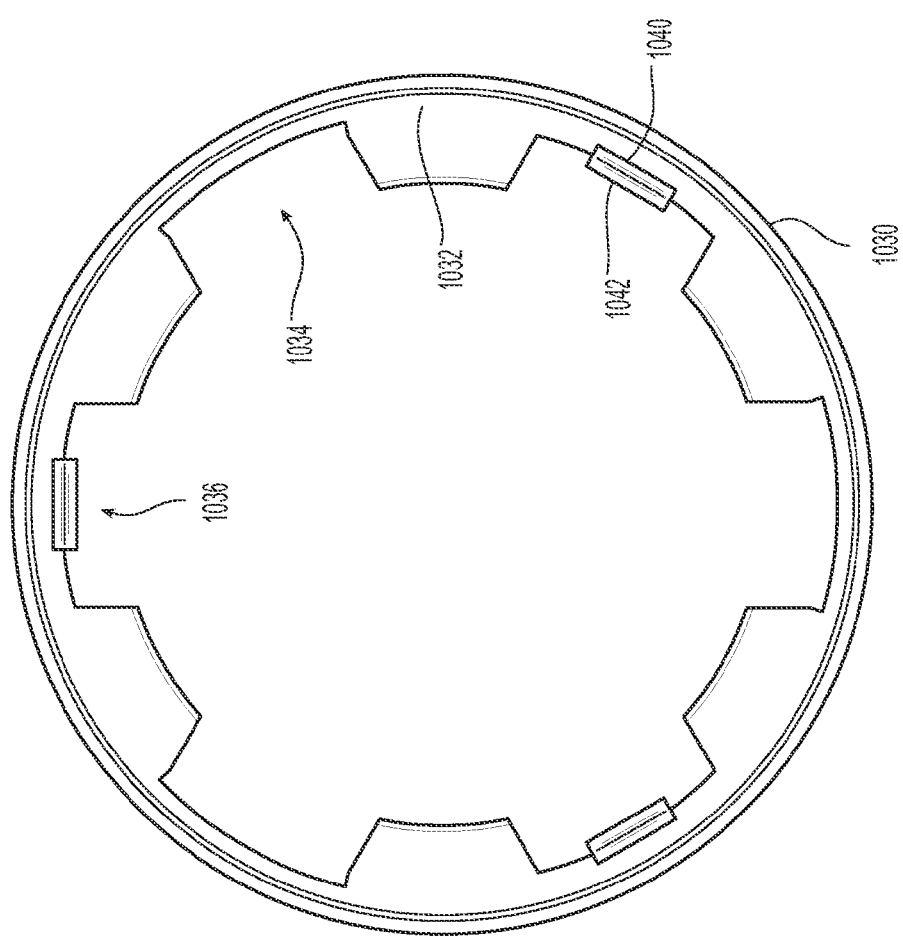
FIG. 20 is a top plan view of the cover of FIG. 19.

The cover 1006 of the nut assembly 1000 is shown in more detail in FIGS. 19 and 20. The cover 1006 comprises a circumferential outer wall 1030. The circumferential outer wall 1030 inhibits tampering and fouling of, for example, the pin and elastic member described above. The cover 1006 also comprises a radially inwardly extending top cap 1032. The radially inwardly extending top cap 1032 has a plurality of first gaps 1034 and a plurality of second gaps 1036 making the radially inwardly extending top cap 1032 a discontinuous surface. The plurality of first gaps 1034 correspond to the elongate slots 1018. The plurality of second gaps 1036 correspond to the lock notches 1020. Arranged in each of the plurality of second gaps is a lock protrusion 1038. The lock protrusion 1038 comprises a lock wall extension 1040 extending vertically from the top cap 1032 and a lock flange 1042 extending generally horizontally and inwardly from the lock wall extension. 1040. The cover 1006 and the nut 1002 form a frictional engagement with the shelf 1022 of the intermediate member 1010 pinched between the top cap 1032 and the lock flange 1042.

The inwardly extending top cap 1032 terminates has an inner extension wall 1044 spaced apart from the circumferential outer wall 1030. The inner extension wall 1044 may terminate in a lip or rolled end as desired. The inner extension wall 1044 is similar in function to the bottom extension surfaces 300 explained above. The circumferential outer wall 1030, top cap 1032, inner extension wall 1044, and the stopping surface 1604 of the washer 1004 form a void 1046. Portions of the pins 710, 810 and the elastic member 910 reside in the void 1046. To the extent a roll or a lip is not used at the end of the inner extension wall 1044, the elastic member is maintained in place by the bottom cap 718 as shown.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A nut assembly comprising:
a nut comprising a conduit extending along a longitudinal axis, a top surface, an outer surface, an intermediate member, at least one bottom extension surface, and at least one radially extending elongate slot in the intermediate member;
a washer comprising a conduit extending along the longitudinal axis, a base, an inner circumferential edge, a bottom surface, a stop surface opposite the bottom surface, an inner wall proximal the inner circumferential edge and extending parallel to the longitudinal axis, the inner wall having a rim with a locking feature;
at least one locking pin operably coupling the nut and the washer, the at least one locking pin sized to engage to and disengage from the locking feature; and
an elastic member extending around the at least one bottom extension surface and engaging the at least one locking pin, wherein
the nut assembly comprises an installed configuration where the at least one locking pin engages the locking feature and the nut assembly comprises an uninstalled configuration where the at least one locking pin is disengaged from the locking feature.

2. The nut assembly of claim 1 wherein the elastic member is a spring.

3. The nut assembly of claim 1 wherein the locking feature comprises a flanged surface and at least one notch.

4. The nut assembly of claim 3 wherein the at least one locking pin comprises:
a top cap;
a plug;
a bottom cap; and
a shaft extending between the top cap and the plug and between the plug and the bottom cap forming a plurality of recesses, wherein
the intermediate member is sized to fit in a first recess of the plurality of recesses between the top cap and the plug when the at least one locking pin is slidingly received in the elongate slot and the flanged surface is sized to fit in a second recess of the plurality of recesses between the plug and the bottom cap.

5. The nut assembly of claim 1 wherein the washer comprises a tang extending radially inwardly into the conduit.

6. The nut assembly of claim 1 wherein the inner wall comprises an inclined outward facing surface.

7. The nut assembly of claim 4 wherein the flanged surface and the at least one notch comprises a curved surface to frictionally engage the plug.

8. The nut assembly of claim 7 wherein the elastic member provides an inwardly directed force such that when the at least one locking pin is engaged with the at least one nut, the nut rotates with respect to the washer on application of a predetermined torque to the nut.

9. The nut assembly of claim 1 wherein the at least one bottom extension surface comprises a plurality of discontinuous bottom extension surfaces that terminate in a flanged surface forming a channel to receive the elastic member.

10. The nut assembly of claim 9 wherein the flanged surface is spaced apart from the stop surface when the nut assembly is in the uninstalled configuration and wherein the flanged surface abuts the stop surface when the nut assembly is in the installed configuration.

11. The nut assembly of claim 10 wherein the at least one locking pin moves radially outward against the elastic member when the nut assembly moves from the uninstalled configuration to the installed configuration.

12. A nut assembly comprising:
a nut comprising a top surface, an outer surface, an intermediate member, and a plurality of bottom extension surfaces, the intermediate member being arranged between the outer surface and the bottom extension surface, the intermediate member comprising a top facing surface, a bottom facing surface and a plurality of elongate slots;
a washer comprising a base having an inner circumferential edge, a bottom surface, a stop surface opposite the bottom surface, an inner wall having a top rim with a radially extending flanged surface and a plurality of notches, the inner wall integral with the washer base and is slidingly received by the bottom extension surfaces of the nut;
a plurality of locking pins where each locking pin comprises at least a top recess, a top shaft, a plug and a bottom recess, wherein the top recess is sized to receive the intermediate member, the top shaft is sized to slidingly fit within one of the plurality of elongate slots, the bottom recess is sized to receive the radially extending flanged surface, and the plug is sized to operatively fit within one of the plurality of notches;

an elastic member extending around the at least one bottom extension surface and engaging the bottom recess of each of the plurality of locking pins, wherein the nut assembly comprises an installed configuration where each plug of the plurality of locking pin engages a corresponding notch and the nut assembly comprises an uninstalled configuration where each plug is disengaged from the plurality of notches.

13. The apparatus of claim 12 wherein the elastic member comprises a garter spring.

14. The apparatus of claim 12 wherein the inner wall of the washer comprises an inclined surface.

15. The apparatus of claim 12 wherein each of the plurality of locking pins comprises a bottom cap with a circumferential edge, and wherein the bottom cap slidingly engages the radially extending flanged surface as the nut rotates with respect to the washer.

16. The apparatus of claim 12 wherein the washer comprises a means for anti-rotation.

17. The apparatus of claim 16 wherein the means for anti-rotation comprises a tang extending radially inward from the inner circumferential edge of the washer.

18. The nut assembly of claim 12 comprising a cover, wherein the cover extends from the intermediate member of the nut to the base of the washer.

19. The nut assembly of claim 12 wherein the plurality of notches are asymmetrical.

20. A nut assembly comprising:

a nut comprising a top surface, an outer surface, and an intermediate member where the intermediate member comprises a top facing surface, a bottom facing surface and a plurality of elongate slots;

a washer comprising a base having an inner circumferential edge, a bottom surface, a stop surface opposite the bottom surface, an inner wall having a top rim with a radially extending flanged surface and a plurality of notches, the inner wall integral with the washer base and is slidingly received by the bottom extension surfaces of the nut;

a cover comprising a circumferential outer wall, a top cap, and an inner extension wall, wherein the top cap comprises a plurality of first gaps and a plurality of second gaps, at least one locking protrusion extends from the top cap proximate at least one of the plurality of second gaps;

a plurality of locking pins where each locking pin comprises at least a top recess, a top shaft, a plug and a bottom recess, wherein the top recess is sized to receive the intermediate member, the top shaft is sized to slidingly fit within one of the plurality of elongate slots, the bottom recess is sized to receive the radially extending flanged surface, and the plug is sized to operatively fit within one of the plurality of notches; and an elastic member extending around the at least one bottom extension surface and engaging the bottom recess of each of the plurality of locking pins, wherein the nut assembly comprises an installed configuration where each plug of the plurality of locking pin engages a corresponding notch and the nut assembly comprises an uninstalled configuration where each plug is disengaged from the plurality of notches.

21. The apparatus of claim 20 wherein the elastic member comprises a garter spring.

22. The apparatus of claim 20 wherein the inner wall of the washer comprises an inclined surface.

23. The apparatus of claim 20 wherein each of the plurality of locking pins comprises a bottom cap with a circumferential edge, and wherein the bottom cap slidingly engages the radially extending flanged surface as the nut rotates with respect to the washer.

24. The apparatus of claim 20 wherein the washer comprises a means for anti-rotation.

25. The apparatus of claim 24 wherein the means for anti-rotation comprises a tang extending radially inward from the inner circumferential edge of the washer.

26. The nut assembly of claim 20 comprising a cover, wherein the cover extends from the intermediate member of the nut to the base of the washer.

27. The nut assembly of claim 20 wherein the plurality of notches are asymmetrical.

* * * * *